US008689539B2

(12) United States Patent
Lu et al.

(10) Patent No.: US 8,689,539 B2
(45) Date of Patent: Apr. 8, 2014

(54) METHODS AND APPARATUSES FOR MODEL BASED CONTROL FOR COUNTER-ROTATING OPEN-ROTOR GAS TURBINE ENGINE

(71) Applicant: General Electric Company, Schenectady, NY (US)

(72) Inventors: Manxue Lu, Swampscott, MA (US); Sheldon Carpenter, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 12 days.

(21) Appl. No.: 13/649,421

(22) Filed: Oct. 11, 2012

(65) Prior Publication Data

US 2013/0269363 A1 Oct. 17, 2013

Related U.S. Application Data

(60) Provisional application No. 61/595,419, filed on Feb. 6, 2012.

(51) Int. Cl.
*F02K 3/02* (2006.01)
(52) U.S. Cl.
USPC .............................. 60/226.1; 60/772; 416/25

(58) Field of Classification Search
USPC ............ 60/39.162, 226.1, 772; 416/1, 25, 26, 416/27
See application file for complete search history.

(56) References Cited

U.S. PATENT DOCUMENTS

| 4,772,179 A * | 9/1988 | Bennett et al. .................. 416/27 |
| 4,772,180 A * | 9/1988 | Walker et al. ................... 416/33 |
| 4,927,329 A * | 5/1990 | Kliman et al. ................. 416/127 |
| 5,242,265 A * | 9/1993 | Hora et al. ...................... 416/26 |
| 2007/0162161 A1* | 7/2007 | Kumar ............................ 700/29 |
| 2011/0286841 A1* | 11/2011 | Talasco et al. .................... 416/1 |
| 2011/0286842 A1 | 11/2011 | Danielson et al. |
| 2013/0202434 A1* | 8/2013 | Lu et al. ............................ 416/1 |

* cited by examiner

*Primary Examiner* — Phutthiwat Wongwian
(74) *Attorney, Agent, or Firm* — General Electric Company; William Scott Andes; Sushupta T. Sudarshan (57) ABSTRACT

Simple, robust and systematic solutions are provided for controlling counter-rotating open-rotor (CROR) gas turbine engines. The solutions mathematically decouple the two counter rotating rotors of a CROR engine by model-based dynamic inversion, which allows application of single-input-single-output (SISO) control concepts. The current solutions allow fuel flow to be treated as a known disturbance and rejected from the rotor speeds control. Furthermore, the current control solutions allow a simple and well-coordinated speed phase synchronizing among the four rotors on a two-engine vehicle.

22 Claims, 5 Drawing Sheets

METHODS AND APPARATUSES FOR MODEL BASED CONTROL FOR COUNTER-ROTATING OPEN-ROTOR GAS TURBINE ENGINE

CROSS-REFERENCE TO RELATED APPLICATIONS

The current application claims priority to U.S. Provisional Application Ser. No. 61/595,419, filed Feb. 6, 2012, the entire disclosure of which is incorporated herein by reference. The current application is related to U.S. Non-Provisional Application Methods and Apparatuses for Non-Model Based Control for Counter-Rotating Open-Rotor Gas Turbine Engine which is being filed concurrent to this application on Oct. 11, 2012.

BACKGROUND OF THE INVENTION

The current disclosure pertains to counter-rotating open-rotor (CROR) gas turbine engines; and, more specifically, control system implementations for such CROR gas turbine engines. For CROR control, the two counter-rotating rotors are functionally coupled to each other, and their operation is further impacted by fuel flow. The current disclosure provides control solutions addressing such problems and relationships.

BRIEF DESCRIPTION OF THE INVENTION

The current disclosure provides simple, robust and systematic solutions that mathematically decouple the two counter rotating rotors of a CROR engine by model-based dynamic inversion, which allows application of single-input-single-output (SISO) control concepts. The current solutions allow fuel flow to be treated as a known disturbance and rejected from the rotor speeds control. Furthermore, the current control solutions allow a simple and well-coordinated speed phase synchronizing among the four rotors on a two-engine vehicle.

According to the current disclosure, a counter-rotating open-rotor gas turbine engine includes: a forward un-ducted rotor including a plurality of forward rotor blades and including a forward rotor angle actuator for setting blade pitch angles of the plurality of forward rotor blades; an aft un-ducted rotor including a plurality of aft rotor blades and including an aft rotor angle actuator for setting blade pitch angles of the plurality of aft rotor blades; a gas turbine engine driving forward and aft un-ducted rotors and including a fuel actuator for setting the fuel flow to the gas turbine engine; and an open rotor control system including, a forward rotor blade pitch angle command (BetaF) electrically connected to the forward rotor angle actuator, an aft rotor blade pitch angle command (BetaA) electrically connected to the aft rotor angle actuator, a fuel flow command (Wf) electrically connected to the fuel actuator, a forward rotor speed feedback signal (Nf), an aft rotor speed feedback signal (Na), and an engine pressure ratio signal (EPR). The open rotor control system may incorporate a control algorithm that includes: a 2×2 multi-input-multi-output (MIMO) control solution for the forward rotor blade pitch angle command (BetaF), the aft rotor blade pitch angle command (BetaA), the forward rotor speed feedback signal (Nf) and the aft rotor speed feedback signal (Na); and a single-input-single-output (SISO) control solution for the fuel flow command (Wf) and the engine pressure measurement feedback signal. More specifically, the open rotor control system may include a control option that considers fuel flow impact on rotor speeds but does not consider rotor blade pitch angles impact on gas generator engine pressure ratio. Additionally, the gas generator fuel flow command (Wf) impact on rotor speeds Nf and Na may be treated as known disturbance input in the 2×2 MIMO control. In a more detailed embodiment, the control algorithm may further include a disturbance rejection path to account for disturbance effect of fuel flow on forward and aft rotor speeds. Alternatively or in addition, the 2×2 MIMO control solution may utilize a dynamic inversion approach.

Also according to the current disclosure, a counter-rotating open-rotor gas turbine engine includes: a forward un-ducted rotor including a plurality of forward rotor blades and including a forward rotor angle actuator for setting blade pitch angles of the plurality of forward rotor blades; an aft un-ducted rotor including a plurality of aft rotor blades and including an aft rotor angle actuator for setting blade pitch angles of the plurality of aft rotor blades; a gas turbine engine driving forward and aft un-ducted rotors and including a fuel actuator for setting the fuel flow to the gas turbine engine; and an open rotor control system including, a forward rotor blade pitch angle command (BetaF) electrically connected to the forward rotor angle actuator, an aft rotor blade pitch angle command (BetaA) electrically connected to the aft rotor angle actuator, a fuel flow command (Wf) electrically connected to the fuel actuator, a forward rotor speed feedback signal (Nf), an aft rotor speed feedback signal (Na), and an engine core speed feedback signal or engine pressure ratio signal (EPR). The open rotor control system may include a multiple-input-multiple output (MIMO) control algorithm including a dynamics inversion approach for at least the forward rotor blade pitch angle command (BetaF), the aft rotor blade pitch angle command (BetaA), the forward rotor speed feedback signal (Nf) and the aft rotor speed feedback signal (Na). More specifically, the open rotor control system may include a multiple-input-multiple output (MIMO) control algorithm including a dynamics inversion approach for at least the forward rotor blade pitch angle command (BetaF), the aft rotor blade pitch angle command (BetaA), the fuel flow command (Wf), the forward rotor speed feedback signal (Nf), the aft rotor speed feedback signal (Na) and the gas generator core speed feedback signal (N2). More specifically, the open rotor control system may include a 3×3 multiple-input-multiple output (MIMO) control algorithm including a dynamics inversion approach for at least the forward rotor blade pitch angle command (BetaF), the aft rotor blade pitch angle command (BetaA), the fuel flow command (Wf), the forward rotor speed feedback signal (Nf), the aft rotor speed feedback signal (Na) and the gas generator core speed feedback signal (N2).

Also, according to the current disclosure, with such counter-rotating open-rotor gas the open rotor control system may further include a speed phase synchronizing control architecture positioned between forward and aft rotor and/or between two engines. In certain embodiments, the speed phase synchronizing control may include a single-input-single-output (SISO) control solution. In certain embodiments the speed phase synchronizing control includes a speed phase synchronization controller that provides a correction input signal to a rotor speed regulator.

Also, according to the current disclosure, a counter-rotating open-rotor gas turbine engine includes: a forward un-ducted rotor including a plurality of forward rotor blades and including a forward rotor angle actuator for setting blade pitch angles of the plurality of forward rotor blades; an aft un-ducted rotor including a plurality of aft rotor blades and including an aft rotor angle actuator for setting blade pitch angles of the plurality of aft rotor blades; a gas turbine engine driving forward and aft un-ducted rotors and including a fuel actuator for setting the fuel flow to the gas turbine engine; and an open rotor control system including, a forward rotor blade pitch angle command (BetaF) electrically connected to the forward rotor angle actuator, an aft rotor blade pitch angle command (BetaA) electrically connected to the aft rotor angle actuator, a fuel flow command (Wf) electrically connected to the fuel actuator, a forward rotor speed feedback signal (Nf), an aft rotor speed feedback signal (Na), and an engine core speed signal N2; where the open rotor control system has a control algorithm that may include a 3×3 multi-input-multi-output (MIMO) control solution for the forward rotor blade pitch angle command (BetaF), the aft rotor blade pitch angle command (BetaA), the fuel flow command (Wf), the forward rotor speed feedback signal (Nf), the aft rotor speed feedback signal (Na) and the engine core speed feedback signal (N2).

Also the current disclosure is directed to any of the control systems described herein and/or any of the methods described herein. For example, the current disclosure provides a method for controlling a counter-rotating open-rotor gas turbine engine that includes, (a) a forward un-ducted rotor including a plurality of forward rotor blades and including a forward rotor angle actuator for setting blade pitch angles of the plurality of forward rotor blades, (b) an aft un-ducted rotor including a plurality of aft rotor blades and including an aft rotor angle actuator for setting blade pitch angles of the plurality of aft rotor blades, and (c) a gas turbine engine driving the forward and aft un-ducted rotors and including a fuel actuator for setting fuel flow to the gas turbine engine, where the method may include steps of (not necessarily performed in any specific order): (1) generating forward and aft control signals respectively for the forward rotor angle actuator and the aft rotor angle actuator; (2) generating a fuel flow command for the fuel actuator; (3) receiving forward and aft rotor feedback signals; and (4) receiving at least one of an engine pressure feedback signal and an engine core speed feedback signal; where the steps of (1) generating the forward and aft control signals and (2) generating the fuel flow signal utilize a control algorithm that may include, a multi-input-multi-output (MIMO) control solution for the forward and aft control signals and the forward and aft rotor feedback signals, and a single-input-single-output (SISO) control solution for the fuel flow command and the at least one of the engine pressure feedback signal and the engine core speed feedback signal. In a more detailed embodiment, the control algorithm may consider fuel flow impact on rotor speeds but does not consider rotor blade pitch angles on gas generator engine pressure ratio. Alternatively, or in addition, the fuel flow command impact on forward and aft rotor feedback signals may be treated as a known disturbance to the MIMO control solution. Alternatively, or in addition, the MIMO control solution utilizes a dynamic inversion control approach.

In an alternate detailed embodiment, the method may include providing a speed phase synchronizing control architecture between (a) the forward and aft rotor feedback signals and (b) input signals to the gas turbine engine. In addition, the speed synchronizing control may include a single-input-single output (SISO) control solution. Alternatively, or in addition, the speed phase synchronizing control may include a speed phase synchronizing controller that provides a correction input signal to a rotor speed regulator.

Another exemplary method provided by the current disclosure is a method for controlling a counter-rotating open-rotor gas turbine engine that includes, (a) a forward un-ducted rotor including a plurality of forward rotor blades and including a forward rotor angle actuator for setting blade pitch angles of the plurality of forward rotor blades, (b) an aft un-ducted rotor including a plurality of aft rotor blades and including an aft rotor angle actuator for setting blade pitch angles of the plurality of aft rotor blades, and (c) a gas turbine engine driving the forward and aft un-ducted rotors and including a fuel actuator for setting fuel flow to the gas turbine engine; where the method may include steps of (not necessarily performed in any specific order): (1) generating forward and aft control signals respectively for the forward rotor angle actuator and the aft rotor angle actuator; (2) generating a fuel flow command for the fuel actuator; (3) receiving forward and aft rotor feedback signals; and (4) receiving at least one of an engine pressure feedback signal and an engine core speed feedback signal; where the steps of (1) generating the forward and aft control signals and (2) generating the fuel flow signal may utilize a control algorithm that includes a multi-input-multi-output (MIMO) control solution including a dynamic inversion approach for the forward and aft control signals, the fuel flow command, the forward and aft rotor feedback signals and the least one of an engine pressure feedback signal and an engine core speed feedback signal. In a more detailed embodiment the MIMO control solution may be a 3×3 MIMO control solution.

DETAILED DESCRIPTION

The current disclosure provides simple, robust and systematic solutions that mathematically decouple the two counter rotating rotors of a CROR engine by model-based dynamic inversion, which allows application of single-input-single-output (SISO) control concepts. The current solutions allow fuel flow to be treated as a known disturbance and rejected from the rotor speeds control. Furthermore, the current control solutions allow a simple and well-coordinated speed phase synchronizing among the four rotors on a two-engine vehicle.

Figure 1:
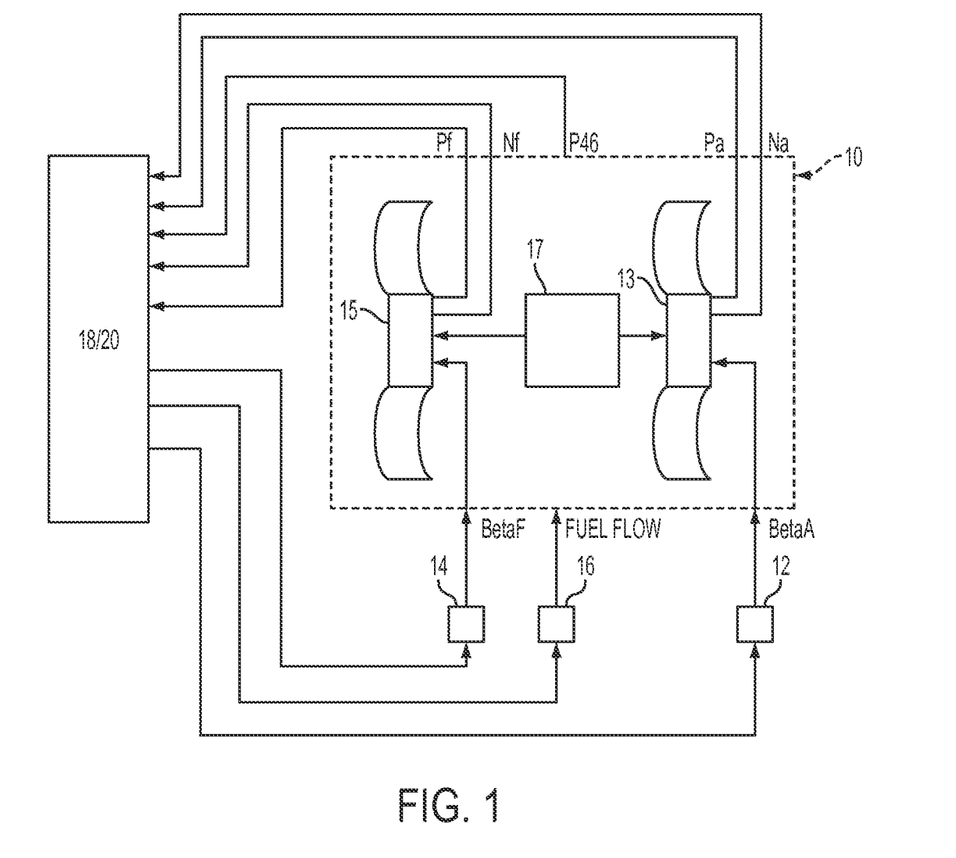
FIG. 1 is a schematic block diagram representation of a basic control system architecture for counter-rotating open-rotor (CROR) gas turbine engine.
Figure 2:
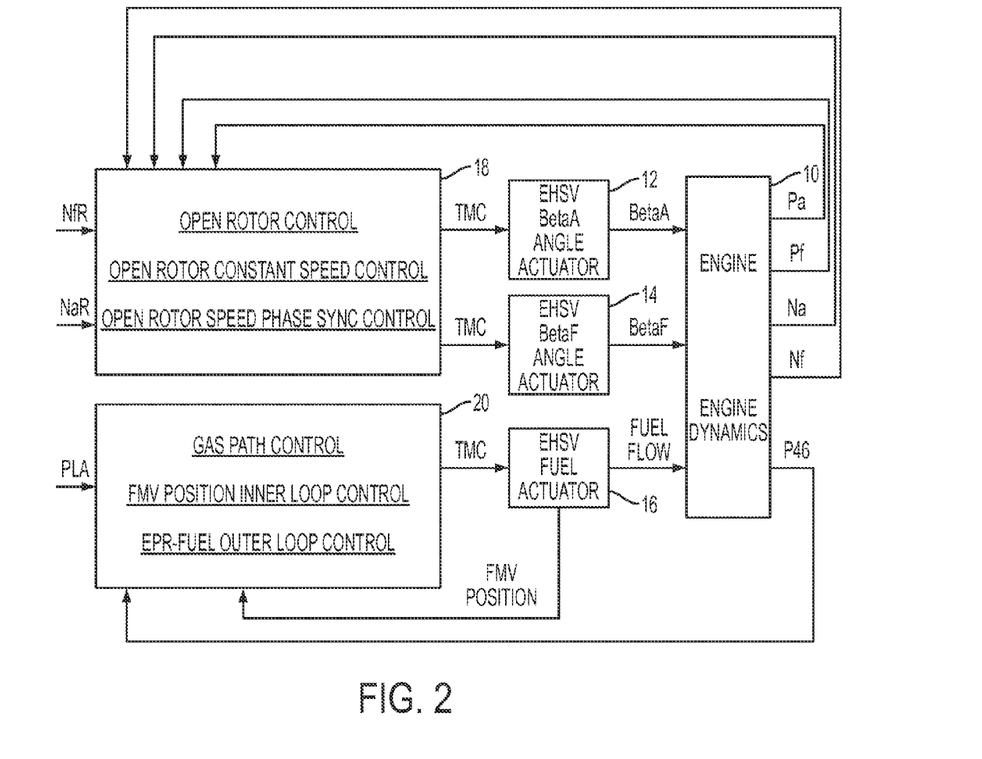
FIG. 2 is another schematic block diagram representation of a basic control system architecture for counter-rotating open-rotor (CROR) gas turbine engine.
Figure 3:
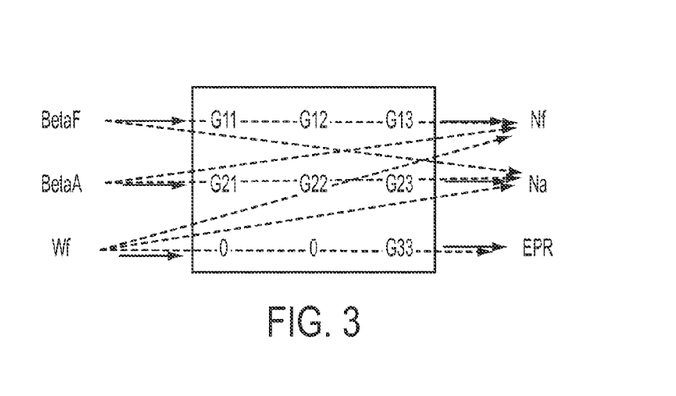
FIG. 3 is a matrix representation of controlled plant input and output mapping for the CROR of FIGS. 1 and 2.

The basic control system architecture for CROR is presented in FIGS. 1 and 2. As shown in FIGS. 1 and 2, an example CROR gas turbine engine 10 includes a differential gearbox 17 mechanically coupled between a forward un-ducted rotor 15 and an aft un-ducted rotor 13, so that the rotor speeds of the respective forward and aft un-ducted rotors 15, 13 are coupled for a given input torque. The example CROR gas turbine engine includes a fuel actuator 16 for setting the fuel flow to the engine and gear box 17. The example CROR gas turbine engine 10 includes (on a very basic level) three inputs: BetaF and BetaA, which are the forward and aft rotor actuator pitch angle input signals, respectively provided by the forward and aft blade pitch angle actuators 14 and 12; and Wf, which is the fuel flow input signal provided by the fuel flow actuator 16. Outputs (again, on a very basic level) from the CROR gas turbine engine 10 include Pa and Pf, which are aft and forward power signal outputs, Na and Nf, which are the aft and forward rotor speed signal outputs, and P46, which is a pressure signal output (an indication of core engine power). The control system includes an open rotor control section 18 and a gas path control section 20. Inputs to the open rotor control section 18 may include, for example, rotor speed Na and Nf, rotor speed phase Pa and Pf feedback signals from the engine 10; and inputs to the gas path control section 20 may include, for example, P46 feedback signal from the engine 10 and an FMV position signal from the fuel actuator 16.

For CROR control, the two counter-rotating rotors are functionally coupled to each other, and their operation is further impacted by fuel flow. For example, the controlled plant input and output mapping for the CROR can be represented in general as shown in FIG. 2 matrix, where Nf and Na are the forward and aft rotor speed signals outputs, BetaF and BetaA are the forward and aft rotor actuator pitch angle actuator input signals, Wf is the fuel flow actuator signal, and EPR is an engine pressure ratio signal.

Previous approaches to solve this problem have ignored the interactions between the forward and aft rotor speed signals, Nf and Na, and have attempted to utilize single-input-single-output control to attempt to maintain each rotor speed tracking their own reference. However, as shown in the controlled plant matrix of FIG. 2, the interactions between the six signals will impact the rotors' constant speed holding control and the rotors' speed phase synchronizing significantly, because this coupling always exists.

First Exemplary Control Solution

Referring again to FIG. 2, where Nf and Na are the forward and aft rotor speed signals outputs, BetaF and BetaA are the forward and aft rotor actuator pitch angle actuator input signals, Wf is the fuel flow actuator signal, and EPR is an engine pressure ratio signal; if the gas generator fuel flow command Wf impact on rotor speeds Nf and Na are treated as known disturbance, such that the control algorithm may include a disturbance rejection path to account for disturbance effect of fuel flow on forward and aft rotor speeds, a 2×2 multi-input-multi-output (MIMO) control solution may be developed for the forward and aft rotor speed signals outputs (Nf and Na) and the forward and aft rotor actuator pitch angle actuator input signals (BetaF and BetaA).

Choose the states, control inputs, outputs and disturbance for open rotor control below:

$$x=[N_f N_a]^T, u=[\beta_f \beta_a]^T, y=[N_f N_a]^T, d=Wf,$$

Assume the original open rotor controlled plant is:

$$x_{k+1}=f(x_k,u_k,d_k)$$

$$y_k=h(x_k,u_k,d_k)$$

At sample k, the system states $x_k$, the inputs $u_{k-1}$, and the disturbances $d_k$ are known. Thus, the deviation variables are expressed about this current operating condition, i.e. $x_k, u_{k-1}, d_k, y_k^- = h(x_k, u_{k-1}, d_k)$ Define the deviation variables from these conditions, $$\tilde{x}_j = x_j - x_k$$

$$\tilde{u}_j = u_j - u_{k-1}$$

$$\tilde{d}_j = d_j - d_k$$

$$\tilde{y}_j = y_j - y_k^-$$

The local linearized model of the system in terms of deviation variables may be derived $$\begin{aligned}
x_{k+1} - x_k &= \tilde{x}_{k+1} \\
&= f(x_k, u_{k-1}, d_k) - x_k + \frac{\partial f}{\partial x}\bigg|_{k,k-1}(x_k - x_k) + \\
&\quad \frac{\partial f}{\partial u}\bigg|_{k,k-1}(u_k - u_{k-1}) + \frac{\partial f}{\partial d}\bigg|_{k,k-1}(d_k - d_k) \\
&= F_k + A\tilde{x}_k + B\tilde{u}_k + B_d\tilde{d}_k
\end{aligned}$$

Approximate $F_k \approx \hat{x}_k = x_k - x_{k-1}$, and it is treated as a known initial condition for $\tilde{x}_{k+1}$ at sample k, or, autonomous response of the system states over one control sample free from any control action update, i.e. $\tilde{u}_k = 0$.

$$\begin{aligned}
y_k - y_k^- &= \tilde{y}_k \\
&= h(x_k, u_{k-1}, d_k) - y_k^- + \frac{\partial h}{\partial x}\bigg|_{k,k-1}(x_k - x_k) + \\
&\quad \frac{\partial h}{\partial u}\bigg|_{k,k-1}(u_k - u_{k-1}) + \frac{\partial h}{\partial d}\bigg|_{k,k-1}(d_k - d_k) \\
&= C\tilde{x}_k + D_u\tilde{u}_k + D_d\tilde{d}_k
\end{aligned}$$

The state space perturbation model for open rotor control is:

$$\begin{bmatrix} \tilde{N}_f(k+1) \\ \tilde{N}_a(k+1) \end{bmatrix} = \begin{bmatrix} a_{11} & a_{12} \\ a_{21} & a_{22} \end{bmatrix}$$

$$\begin{bmatrix} \tilde{N}_f(k) \\ \tilde{N}_a(k) \end{bmatrix} + \begin{bmatrix} b_{11} & b_{12} \\ b_{21} & b_{22} \end{bmatrix} \begin{bmatrix} \tilde{\beta}_f(k) \\ \tilde{\beta}_a(k) \end{bmatrix} + \begin{bmatrix} b_{df} \\ b_{da} \end{bmatrix} \tilde{W}f(k) + F_k$$

$$\begin{bmatrix} \tilde{N}_f(k) \\ \tilde{N}_a(k) \end{bmatrix} = \begin{bmatrix} c_{11} & c_{12} \\ c_{21} & c_{22} \end{bmatrix} \begin{bmatrix} \tilde{N}_f(k) \\ \tilde{N}_a(k) \end{bmatrix} + \begin{bmatrix} d_{df} \\ d_{da} \end{bmatrix} \tilde{W}f(k)$$

$$\tilde{x}(k+1) = A\tilde{x}(k) + B\tilde{u}(k) + B_d\tilde{d}(k) + F_k$$

$$\tilde{y}(k) = C\tilde{x}(k) + D_d\tilde{d}(k)$$

Where $\tilde{x}(k)=0$, $\tilde{d}(k)=0$, and $\tilde{y}(k)=0$ by definition.

Approximations:

$$d(k)-d(k-1)=d(k+1)-d(k),$$

$$\tilde{d}(k+1)=d(k+1)-d(k)\approx \hat{d}(k).$$

Since Gas Path is decoupled from the open rotor inputs, Wf–EPR loop can be treated as a SISO plant and non-model based SISO control can be used for Wf–EPR loop, e.g., PID control. As a SISO plant, it can be model based SISO control or traditional Gain-scheduling SISO control. It is also within the scope of the current disclosure that Wf–EPR loop can be incorporated into the above state space model, but it may not be necessary for a well known SISO plant to do so.

Let $EPR_{err}=EPRref-EPR$. From a typical PID implementation, $$Wf = \left(K_p + K_d s + K_i \frac{1}{s}\right) EPR_{err}$$

$$= \frac{K_i\left(1 + \frac{K_p}{K_i} s + \frac{K_d}{K_i} s^2\right)}{s} EPR_{err}$$

$$= \frac{K_i(1 + \tau_1 s)(1 + \tau_2 s)}{s} EPR_{err}$$

Use Tustin transformation, i.e.

$$s = \frac{2}{T} \frac{(z-1)}{(z+1)}$$

Then the discrete-time transfer function is:

$$Wf = \frac{K_i[n_0 z^2 + n_1 z + n_2]}{[d_0 z^2 + d_2]} EPR_{err} = \frac{K_n[z^2 + n_{n1} z + n_{n2}]}{[z^2 + d_{n2}]} EPR_{err}$$

And the discrete-time state space model for PID controller is obtained via Observability Canonical Realization as:

$$x_w(k+1) = \begin{bmatrix} 0 & 1 \\ -d_{n2} & 0 \end{bmatrix} x_w(k) + \begin{bmatrix} n_{n1} \\ n_{n2} - d_{n2} \end{bmatrix} EPR_{err}(k)$$

$$Wf(k) = [1 \ 0] K_n x_w(k) + K_n EPR_{err}(k)$$

For open rotor controlled plant model, assume $N_f$ and $N_a$ both have relative degree 1, respectively, which is reasonable because actuator command to torque is algebraic relationship, and torque to rotor speed is $1^{st}$ order dynamics, then, $$\tilde{y}_{i,k+1} = C_i \tilde{x}_{k+1} + D_{di} \tilde{d}_{k+1}$$
$$= C_i(A\tilde{x}_k + B\tilde{u}_k + B_d \tilde{d}_k + F_k) + D_{di} \tilde{d}_{k+1}$$
$$= C_i B \tilde{u}_k + C_i F_k + D_{di} \hat{d}_k$$
$$= E_i \tilde{u}_k + C_i F_k + D_{di} \hat{d}_k$$

Let $\hat{y}_i(k+j) = y_{ri}(k+j) - y_i(k)$, $j = 0, 1$

The desired output tracking response is:

$$(\hat{y}_i(k+1) - \tilde{y}_i(k+1)) + k_{i,0}(\hat{y}_i(k) - \tilde{y}_i(k)) = 0$$

Properly choose $k_{i,0}$, i=1, 2 such that the following polynomial $$\rho + k_{i,0} = 0$$

has its eigenvalue within the unit circle, then the output tracking is asymptotically stable.

Furthermore, $$\tilde{y}_i(k+1) = \hat{y}_i(k+1) + k_{i,0} \hat{y}_i(k)$$

For open rotor speed references are constant in general, therefore, $$\tilde{y}_i(k+1) = (1 + k_{i,0}) \hat{y}_i(k) = K_{ei} \hat{y}_i(k)$$

Compare the above desired output response with $$\tilde{y}_{i,k+1} = E_i \tilde{u}_k + C_i F_k + D_{di} \hat{d}_k,$$

$$K_{ei} \hat{y}_i(k) = E_i \tilde{u}_k + C_i F_k + D_{di} \hat{d}_k,$$

$$\ddot{u}(k) = E^{-1} K_e \hat{y}(k) - E^{-1} CF_k - E^{-1} D_d \hat{d}(k) = K_V \hat{y}(k) + K_F F_k + K_D \hat{d}(k)$$

Where $K_e$ is diagonal, $K_V = K_E^{-1}$, $K_E = E^{-1} K_e$, $\hat{y}(k) = y_r(k) - y(k)$, $F_k = x(k) - x(k-1)$, $\hat{d}(k) = Wf(k) - Wf(k-1)$.

Figure 4:
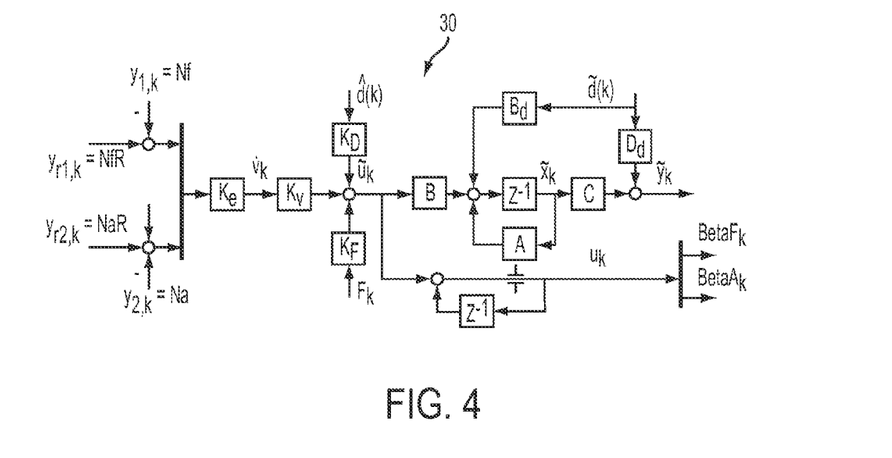
FIG. 4 is a block diagram representation of an exemplary control architecture according to the current disclosure.

The decoupled control architecture 30 with disturbance rejection for holding constant speed is presented in FIG. 4.

As shown in FIG. 4, the controlled plant perturbation model 30 is described by A, B, C, $B_d$, $D_d$, with control input vector Beta actuator (BetaF and BetaA) increment $\ddot{u}_k$, output vector rotor speed (Nf and Na) perturbation $\ddot{y}_k$, and disturbance fuel flow (Wf) perturbation $\ddot{d}_k$, which are defined in [0025]-[0030]. The controlled plant input $\ddot{u}_k$ and the output $\ddot{y}_k$ are coupled. The decoupled control introduces $K_V$, $K_F$, $K_D$, where $K_F$ decouples and cancels the original dynamics by increment state feedback $F_K$, $K_D$ decouples and cancels the original disturbance by increment disturbance $\hat{d}_k$, $K_V$ decouples the coupled input $\ddot{u}_k$ and output $\ddot{k}_k$ and reshapes the desired controlled plant with new control input $\dot{v}_K$ and output $\ddot{y}_k$ in SISO relationship. The output tracking control introduces $K_e$ to close the rotor speeds (Nf and Na) to their command references (NfR and NaR) such that the closed-loop SISO control based on the decoupled controlled plant (the input $\dot{v}_K$ and output $\ddot{k}_k$) achieves the desired control performance: Nf tracks NfR, and Na tracks NaR. The decoupling control law is $\ddot{u}_k = K_V \dot{v}_k + K_F F_k + K_D \hat{d}_k$, the increment actuator control input $\ddot{u}_k$ needs to be integrated to generate the actuator control input $u_k$, i.e., BetaF$_k$ and BeatA$_k$, which are applied to Beta Actuators, respectively.

Since $y_1$ and $y_2$ are decoupled, that is, $v_1(k) = E^{-1}(1,1)K_e(1,1)\hat{y}_1(k) = K_{e1}\hat{y}_1(k)$ affects $y_1$ only, and $v_2(k) = E^{-1}(2,2)K_e(2,2)\hat{y}_2(k) = K_{e2}\hat{y}_2(k)$ affects $y_2$ only. Therefore, the speed phase synchronizing between $y_1$ and $y_2$ can be treated as an inner loop correction of any of the two decoupled SISO control loops.

The phase feedback is defined as the average value in a certain time period (e.g., 6 samples):

$$avePh = \frac{1}{6} \sum_{i=1}^{6} (Ph_{1,i} - Ph_{2,i}) = Ph_f - Ph_a$$

$$errPh = PhDmd - avePh = 0 - avePh = Ph_a - Ph_f$$

Then speed phase sync between the two rotors—R2R Sync control can be done by locally adjusting $v_2$ to keep $y_2$ phase synchronizing with $y_1$.

Figure 5:
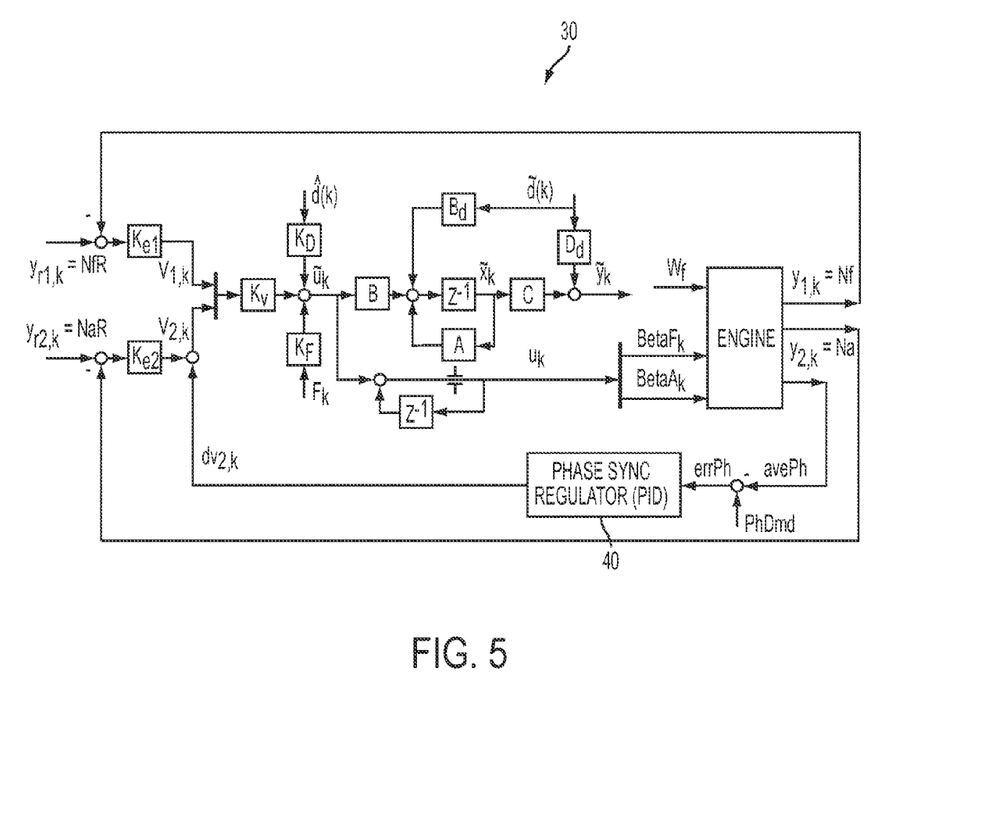
FIG. 5 is a block diagram representation of the exemplary control architecture of FIG. 4, including phase synchronization.

The R2R Sync control structure is presented in FIG. 5. The Phase Sync Regulator 40 determines the sign of $dv_2$ based on the following rules:

If $0° < errPh \leq 180°$ or $-360° < errPh \leq 180°$, Na is leading Nf, Na needs to be slowed down, i.e., $dv_2 < 0$;

else if $180° < errPh < 360°$ or $-180° < errPh < 0°$, Na is behind Nf,

Na needs to be speeded up, i.e., $dv_2 > 0$;

For engine to engine (E2E) speed phase sync, since Nf and Na are decoupled for each engine, the Nfs from two engines need to be synchronized. Assume that Engine1 is specified as Master, Engine2 needs to be synchronized to Engine1. Define $$errPhEng = Ph_{f1} - Ph_{f2}$$

Figure 6:
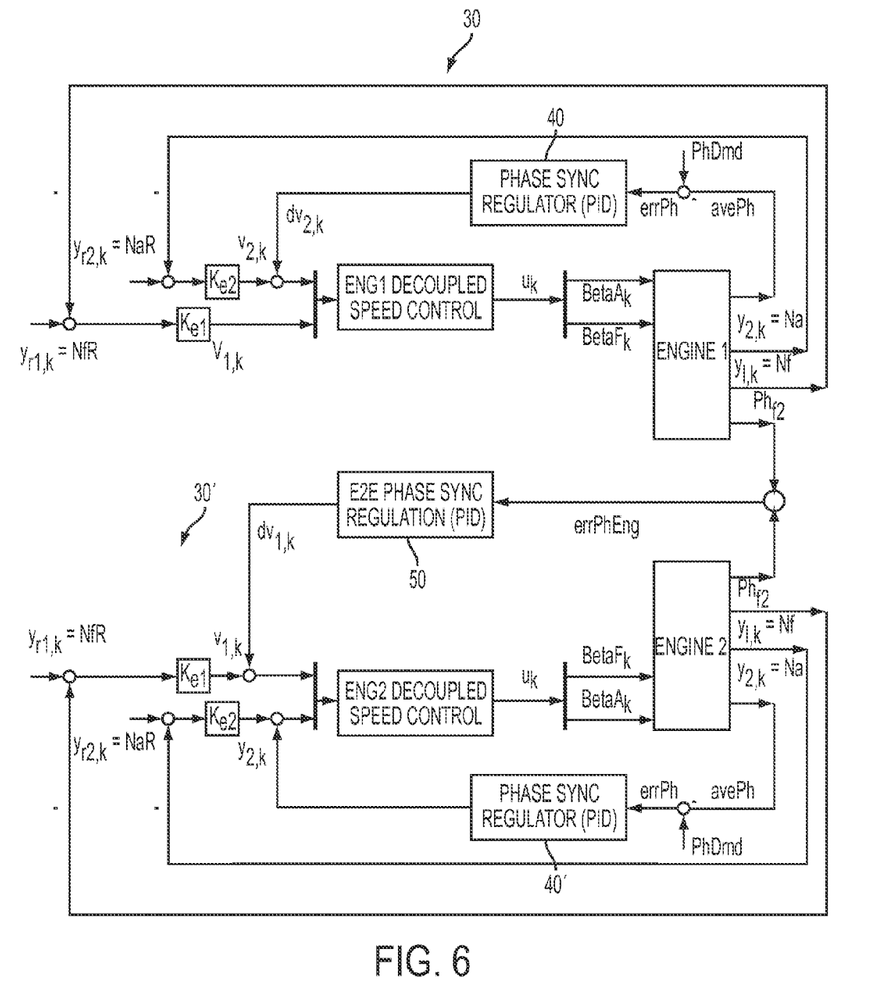
FIG. 6 is a block diagram representation of the exemplary control architecture of FIGS. 4 and 5 as applied to two engines.

The E2E Sync control structure is presented in FIG. 6, where a second engine control architecture 30' and corresponding Phase Sync Regulator 40' are provided. The E2E Phase Sync Regulator 50 determines the sign of $dv_1$ based on the following rules:

If $0° < \text{errPhEng} \le 180°$ or $-360° < \text{errPhEng} \le -180°$, E2 is leading E1,
E2 needs to be slowed down, i.e., $dv_1 < 0$;
else if $180° < \text{errPhEng} < 360°$ or $-180° < \text{errPhEng} < 0°$, E2 is behind E1,
E2 needs to be speeded up, i.e., $dv_1 > 0$;

With the decoupled speed control, the rotor to rotor speed phase sync and engine to engine speed phase sync become classical SISO control design in the very simple system structure.

Second Exemplary Control Solution

For open rotor control, when the two counter-rotating rotors are mechanically coupled by a differential gearbox, the core speed N2 and the open rotor speeds are highly coupled. The controlled plant input and output mapping can be represented in general as in FIG. 7, where BetaF and BetaA are forward rotor and aft rotor actuator inputs, respectively, Wf is fuel flow actuator. Nf and Na are BetaF forward rotor and aft rotor speeds, N2 is engine core speed.

Figure 7:
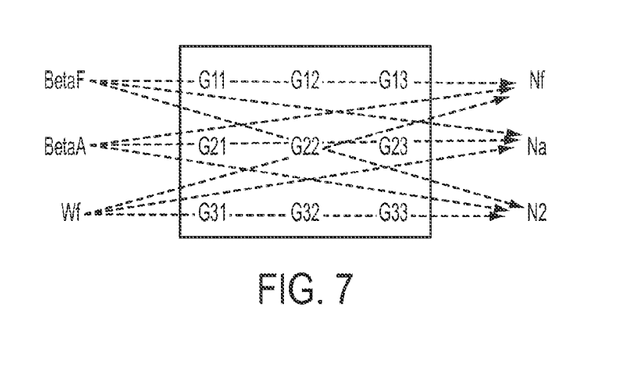
FIG. 7 is another matrix representation of controlled plant input and output mapping for the CROR of FIGS. 1 and 2.

Choose the states, control inputs, controlled outputs for open rotor control shown in FIG. 7.

$$x = [N_f N_a N_2]^T,\ u = [\beta_f \beta_a Wf]^T,\ y = [N_f N_a N_2]^T,$$

The rotor speed dynamics, the engine core speed dynamics, the coupling between the two rotors, and the coupling between the gas generator and the rotors are all characterized in the following perturbation model:

$$\begin{bmatrix} \tilde{N}_f(k+1) \\ \tilde{N}_a(k+1) \\ \tilde{N}_2(k+1) \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} \tilde{N}_f(k) \\ \tilde{N}_a(k) \\ \tilde{N}_2(k) \end{bmatrix} + \begin{bmatrix} b_{11} & b_{12} & b_{13} \\ b_{21} & b_{22} & b_{23} \\ b_{31} & b_{32} & b_{33} \end{bmatrix} \begin{bmatrix} \tilde{\beta}_f(k) \\ \tilde{\beta}_a(k) \\ \tilde{W}f(k) \end{bmatrix} + F_k$$

$$\begin{bmatrix} \tilde{N}_f(k) \\ \tilde{N}_a(k) \\ \tilde{N}_2(k) \end{bmatrix} = \begin{bmatrix} 1 & 0 & 0 \\ 0 & 1 & 0 \\ 0 & 0 & 1 \end{bmatrix} \begin{bmatrix} \tilde{N}_f(k) \\ \tilde{N}_a(k) \\ \tilde{N}_2(k) \end{bmatrix}$$

$$\tilde{x}(k+1) = A\tilde{x}(k) + B\tilde{u}(k) + F_k$$

$$\tilde{y}(k) = C\tilde{x}(k)$$

Where $\ddot{x}(k) = 0$, and $\ddot{y}(k) = 0$ by definition.

For open rotor controlled plant model, assume $N_f$, $N_a$ and $N_2$ all have relative degree 1, respectively, which is reasonable because actuator command to torque is algebraic relationship, and torque to rotor or turbine speed is $1^{st}$ order dynamics, then, $$\tilde{y}_{i,k+1} = C_i \tilde{x}_{k+1}$$
$$= C_i(A\tilde{x}_k + B\tilde{u}_k + F_k)$$
$$= C_i B\tilde{u}_k + C_i F_k$$
$$= E_i \tilde{u}_k + C_i F_k$$

Let $\hat{y}_i(k+j) = y_{ri}(k+j) - y_i(k)$,
$j = 0, 1$

The desired output tracking response is:

$$(\hat{y}_i(k+1) - \tilde{u}_i(k+1)) + k_{i,0}(\hat{y}_i(k) - \tilde{y}_i(k)) = 0$$

Properly choose $k_{i,0}$, $i=1,2,3$ such that the following polynomial $$\rho + k_{i,0} = 0$$

has its eigenvalue within the unit circle, then the output tracking is asymptotically stable.

Furthermore, $$\tilde{y}_i(k+1) = \hat{y}_i(k+1) + k_{i,0}\hat{y}_i(k)$$

For rotor speed references are constant in general, therefore, $$\tilde{y}_i(k+1) = (1+k_{i,0})\hat{y}_i(k) = K_{ei}\hat{y}_i(k)$$

Compare the above desired output response with $$\tilde{y}_{i,k+1} = E_i \tilde{u}_k + C_i F_k$$

$$K_{ei}\hat{y}_i(k) = E_i \tilde{u}_k + C_i F_k$$

$$\tilde{u}(k) = E^{-1} K_e \hat{y}(k) - E^{-1} C F_k = K_E \hat{y}(k) + K_F F_k$$

Where $K_e$ is diagonal, $\hat{y}(k) = y_r(k) - y(k)$, $F_k = x(k) - x(k-1)$

Figure 8:
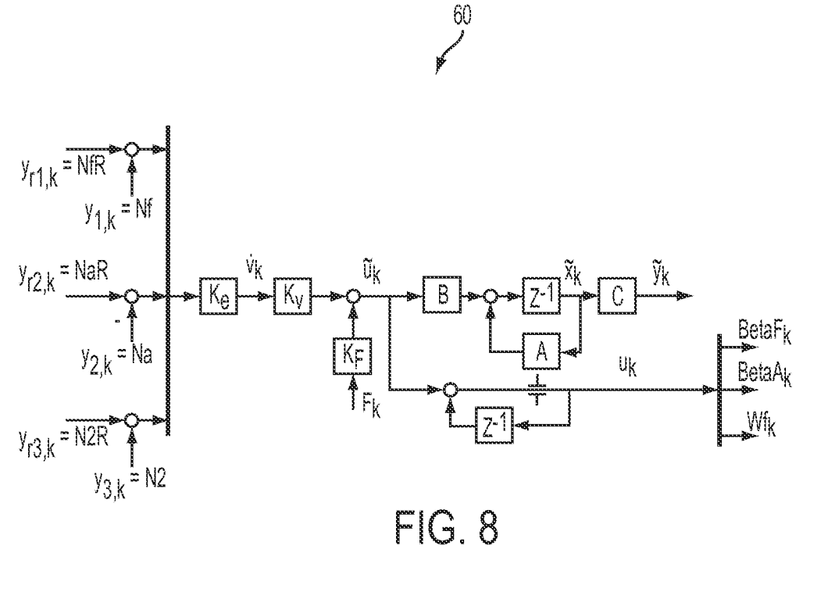
FIG. 8 is a block diagram representation of another exemplary control architecture according to the current disclosure.

The decoupled control 60 for holding constant speed is presented in FIG. 8. This solution is essentially a 3×3 multi-input-multi-output variant of the embodiments of FIGS. 4-6 when both rotor-rotor coupling and rotor-core coupling relationships are substantial. FIG. 8 provides a system level diagram of the 3×3 MIMO control for Open Rotor Engine Control. Dynamic inversion provides mathematical decoupling of control inputs (BetaF, BetaA, WO and outputs (Nf, Na, N2) relationships.

As shown in FIG. 8, the controlled plant perturbation model 60 is described by A, B, C, with control input vector Beta actuator (BetaF and BetaA) and fuel actuator (Wf) increment $\tilde{u}_k$, output vector rotor speed (Nf and Na) and core speed (N2) perturbation $\tilde{y}_k$, which are defined in [0049]-[0051]. The controlled plant input $\tilde{u}_k$ and the output $\tilde{y}_k$ are coupled. The decoupled control introduces $K_V$, $K_F$, where $K_F$ decouples and cancels the original dynamics by increment state feedback $F_K$, $K_V$ decouples the coupled input $\tilde{u}_k$ and the output $\tilde{y}_k$ and reshapes the desired controlled plant with new control input $\dot{v}_K$ and output $\tilde{y}_k$ in SISO relationship. The output tracking control introduces $K_e$ to close the rotor speeds (Nf and Na) to their command references (NfR and NaR) and core speed (N2) to its command reference (N2R) such that the closed-loop SISO control based on the decoupled controlled plant (the input $\dot{v}_K$ and output $\tilde{y}_k$) achieves the desired control performance: Nf tracks NfR, Na tracks NaR, and N2 tracks N2R. The decoupling control law is $\tilde{u}_k = K_V \dot{v}_k + K_F F_k$, the increment actuator control input $\tilde{u}_k$ needs to be integrated to generate the actuator control input $u_k$, i.e., BetaF$_k$ and BeatA$_k$, and Wf$_k$ which are applied to Beta Actuators and fuel actuator, respectively.

With the current embodiment, when the rotor blade pitch angles BetaF and BetaA impact on gas generator output(s) can be neglected, then the corresponding elements in the 3×3 decoupling matrix transfer function can be simply zeroed out. The resulting control can be functionally equivalent to the control of FIG. 4, except that the controlled output for gas generator is core speed N2 rather than engine pressure ratio EPR.

Since $y_1$ and $y_2$ are decoupled from each other, and both they are decoupled from $y_3$, that is, $v_1$ affects $y_1$ only, and $v_2$ affects $y_2$ only. Therefore, the speed phase synchronizing between $y_1$ and $y_2$, or between $y_1$ of engine 1 and $y_1$ of engine 2 can be substantially the same as shown in the embodiment of FIGS. 4 and 5.

It is to be understood the control system architectures disclosed herein may be provided in any manner known to those of ordinary skill, including software solutions, hardware or firmware solutions, and combinations of such. Such solutions would incorporate the use of appropriate processors, memory (and software embodying any algorithms described herein may be resident in any type of non-transitory memory), circuitry and other components as is known to those of ordinary skill.

Having disclosed the inventions described herein by reference to exemplary embodiments, it will be apparent to those of ordinary skill that alternative arrangements and embodiments may be implemented without departing from the scope of the inventions as disclosed herein. Further, it will be understood that it is not necessary to meet any of the objects or advantages of the invention(s) stated herein to fall within the scope of such inventions, because undisclosed or unforeseen advantages may exist.

What is claimed is:

1. A counter-rotating open-rotor gas turbine engine comprising:
   a forward un-ducted rotor including a plurality of forward rotor blades and including a forward rotor angle actuator for setting blade pitch angles of the plurality of forward rotor blades;
   an aft un-ducted rotor including a plurality of aft rotor blades and including an aft rotor angle actuator for setting blade pitch angles of the plurality of aft rotor blades;
   a gas turbine engine driving forward and aft un-ducted rotors and including a fuel actuator for setting the fuel flow to the gas turbine engine; and
   an open rotor control system including, a forward rotor blade pitch angle command (BetaF) electrically connected to the forward rotor angle actuator, an aft rotor blade pitch angle command (BetaA) electrically connected to the aft rotor angle actuator, a fuel flow command (Wf) electrically connected to the fuel actuator, a forward rotor speed feedback signal (Nf), an aft rotor speed feedback signal (Na), and at least two of the engine pressure measurement feedback signals for calculating the engine pressure ratio (EPR) and an engine core speed signal (N2);
   the open rotor control system including a control algorithm including,
      a 2×2 multi-input-multi-output (MIMO) control solution for the forward rotor blade pitch angle command (BetaF), the aft rotor blade pitch angle command (BetaA), the forward rotor speed feedback signal (Nf) and the aft rotor speed feedback signal (Na); and
      a single-input-single-output (SISO) control solution for the fuel flow command (Wf) and the at least two of the engine pressure measurement feedback signals for calculating the engine pressure ratio (EPR) and the engine core speed signal (N2).

2. The counter-rotating open-rotor gas turbine engine of claim 1, wherein the open rotor control system includes a control option that considers fuel flow impact on rotor speeds but does not consider rotor blade pitch angles on gas generator engine pressure ratio.

3. The counter-rotating open-rotor gas turbine engine of claim 1, wherein the gas generator fuel flow command (Wf) impact on rotor speed feedback signals (Nf and Na) is treated as a known disturbance input to the 2×2 MIMO control solution.

4. The counter-rotating open-rotor gas turbine engine of claim 1, wherein the control algorithm further includes a disturbance rejection path to account for disturbance effect of fuel flow on forward and aft rotor speeds.

5. The counter-rotating open-rotor gas turbine engine of claim 1, wherein the 2×2 MIMO control solution utilizes a dynamics inversion control approach.

6. The counter-rotating open-rotor gas turbine engine of claim 1, wherein the open rotor control system further includes a speed phase synchronizing control architecture positioned between (a) forward and aft rotor phase output feedback signals and (b) input signals to an engine speed regulator.

7. The counter-rotating open-rotor gas turbine engine of claim 6, wherein the speed synchronizing control includes a single-input-single-output (SISO) control solution.

8. The counter-rotating open-rotor gas turbine engine of claim 6, wherein the speed phase synchronizing control includes a speed phase synchronizing controller that provides a correction input signal to a rotor speed regulator.

9. A counter-rotating open-rotor gas turbine engine comprising:
   a forward un-ducted rotor including a plurality of forward rotor blades and including a forward rotor angle actuator for setting blade pitch angles of the plurality of forward rotor blades;
   an aft un-ducted rotor including a plurality of aft rotor blades and including an aft rotor angle actuator for setting blade pitch angles of the plurality of aft rotor blades;
   a gas turbine engine driving forward and aft un-ducted rotors and including a fuel actuator for setting the fuel flow to the gas turbine engine; and
   an open rotor control system including, a forward rotor blade pitch angle command (BetaF) electrically connected to the forward rotor angle actuator, an aft rotor blade pitch angle command (BetaA) electrically connected to the aft rotor angle actuator, a fuel flow command (Wf) electrically connected to the fuel actuator, a forward rotor speed feedback signal (Nf), an aft rotor speed feedback signal (Na), and at least one of an engine pressure measurement feedback signal (EPR) and a gas generator core speed feedback signal (N2);
   the open rotor control system including a multiple-input-multiple-output (MIMO) control algorithm including a dynamic inversion matrix control solution for at least the forward rotor blade pitch angle command (BetaF), the aft rotor blade pitch angle command (BetaA), the forward rotor speed feedback signal (NO and the aft rotor speed feedback signal (Na).

10. The counter-rotating open-rotor gas turbine engine of claim 9, wherein the open rotor control system includes a 3×3 multiple-input-multiple-output (MIMO) control algorithm including a dynamics inversion approach for at least the forward rotor blade pitch angle command (BetaF), the aft rotor blade pitch angle command (BetaA), the fuel flow command (Wf), the forward rotor speed feedback signal (Nf), the aft rotor speed feedback signal (Na) and the gas generator core speed feedback signal (N2).

11. The counter-rotating open-rotor gas turbine engine of claim 9, wherein the open rotor control system further includes a speed phase synchronizing control architecture positioned between (a) forward and aft rotor phase output feedback signals and (b) input signals to an engine speed regulator.

12. The counter-rotating open-rotor gas turbine engine of claim 11, wherein the speed synchronizing control includes a single-input-single-output (SISO) control solution.

13. The counter-rotating open-rotor gas turbine engine of claim 11, wherein the speed phase synchronizing control includes a speed phase synchronizing controller that provides a correction input signal to a rotor speed regulator.

14. A method for controlling a counter-rotating open-rotor gas turbine engine that includes, (a) a forward un-ducted rotor including a plurality of forward rotor blades and including a forward rotor angle actuator for setting blade pitch angles of the plurality of forward rotor blades, (b) an aft un-ducted rotor including a plurality of aft rotor blades and including an aft rotor angle actuator for setting blade pitch angles of the plurality of aft rotor blades, and (c) a gas turbine engine driving the forward and aft un-ducted rotors and including a fuel actuator for setting fuel flow to the gas turbine engine, the method comprising steps of:

generating forward and aft control signals respectively for the forward rotor angle actuator and the aft rotor angle actuator;

generating a fuel flow command for the fuel actuator;

receiving forward and aft rotor feedback signals; and receiving at least one of an engine pressure feedback signal and an engine core speed feedback signal;

wherein the steps of generating the forward and aft control signals and generating the fuel flow signal utilize a control algorithm that includes,
a multi-input-multi-output (MIMO) control solution for the forward and aft control signals and the forward and aft rotor feedback signals, and
a single-input-single-output (SISO) control solution for the fuel flow command and the at least one of the engine pressure feedback signal and the engine core speed feedback signal.

15. The method of claim 14, wherein the control algorithm considers fuel flow impact on rotor speeds but does not consider rotor blade pitch angles on gas generator engine pressure ratio.

16. The method of claim 14, wherein the fuel flow command impact on forward and aft rotor feedback signals is treated as a known disturbance to the MIMO control solution.

17. The method of claim 16, wherein the MIMO control solution utilizes a dynamic inversion control approach.

18. The method of claim 14, further comprising providing a speed phase synchronizing control architecture between (a) the forward and aft rotor feedback signals and (b) input signals to the gas turbine engine.

19. The method of claim 18, wherein the speed synchronizing control includes a single-input-single output (SISO) control solution.

20. The method of claim 18, wherein the speed phase synchronizing control includes a speed phase synchronizing controller that provides a correction input signal to a rotor speed regulator.

21. A method for controlling a counter-rotating open-rotor gas turbine engine that includes, (a) a forward un-ducted rotor including a plurality of forward rotor blades and including a forward rotor angle actuator for setting blade pitch angles of the plurality of forward rotor blades, (b) an aft un-ducted rotor including a plurality of aft rotor blades and including an aft rotor angle actuator for setting blade pitch angles of the plurality of aft rotor blades, and (c) a gas turbine engine driving the forward and aft un-ducted rotors and including a fuel actuator for setting fuel flow to the gas turbine engine, the method comprising steps of:

generating forward and aft control signals respectively for the forward rotor angle actuator and the aft rotor angle actuator;

generating a fuel flow command for the fuel actuator;

receiving forward and aft rotor feedback signals; and receiving at least one of an engine pressure feedback signal and an engine core speed feedback signal;

wherein the steps of generating the forward and aft control signals and generating the fuel flow signal utilize a control algorithm that includes a multi-input-multi-output (MIMO) control solution including a dynamics inversion approach for the forward and aft control signals, the fuel flow command, the forward and aft rotor feedback signals and the least one of an engine pressure feedback signal and an engine core speed feedback signal.

22. The method of claim 21, wherein the MIMO control solution is a 3×3 MIMO control solution.

* * * * *

UNITED STATES PATENT AND TRADEMARK OFFICE
CERTIFICATE OF CORRECTION

PATENT NO. : 8,689,539 B2  
APPLICATION NO. : 13/649421  
DATED : April 8, 2014  
INVENTOR(S) : Lu et al.

Page 1 of 2

It is certified that error appears in the above-identified patent and that said Letters Patent is hereby corrected as shown below:

In the Specification

In Column 5, Line 58, delete "$x_{k+1}=f(k,u_k,d_k)$" and insert -- $x_{k+1}=f(x_k,u_k,d_k)$ --, therefor.

In Column 8, Line 1, delete "$K_{ei}\ddot{y}_i(k)=E_i\ddot{u}_k+C_iF_k+D_{di}\hat{d}_k$," and insert -- $K_{ei}\hat{y}_i(k)=E_i\tilde{u}_k+C_iF_k+D_{di}\hat{d}_k$, --, therefor.

In Column 8, Lines 3-4, delete "$\tilde{u}(k)=E^{-1}K_e\hat{y}(k)-E^{-1}CF_k-E^{-1}D_d\hat{d}(k)=K_E\hat{y}(k)+K_FF_k+K_D\hat{d}(k)$" and insert -- $\tilde{u}(k)=E^{-1}K_e\hat{y}(k)-E^{-1}CF_k-E^{-1}D_d\hat{d}(k)=K_E\hat{y}(k)+K_FF_k+K_D\hat{d}(k)$ --, therefor.

In Column 8, Line 5, delete "$=K_E^{-1}$," and insert -- $=E^{-1}$, --, therefor.

In Column 8, Line 5, delete "$=y_,(k)$," and insert -- $=y_r(k)$ --, therefor.

In Column 8, Line 11, delete "$\ddot{u}_k$," and insert -- $\tilde{u}_k$, --, therefor.

In Column 8, Line 12, delete "$\ddot{y}_k$," and insert -- $_k$, --, therefor.

In Column 8, Line 13, delete "$\ddot{d}_k$," and insert -- $_k$, --, therefor.

In Column 8, Line 14, delete "$\ddot{u}_k$ and the output $\ddot{y}_k$" and insert -- $\tilde{u}_k$ and the output $_k$ --, therefor.

In Column 8, Line 19, delete "$\ddot{u}_k$" and insert -- $\tilde{u}_k$ --, therefor.

Signed and Sealed this  
Thirty-first Day of March, 2015

Michelle K. Lee  
*Director of the United States Patent and Trademark Office*

CERTIFICATE OF CORRECTION (continued)
U.S. Pat. No. 8,689,539 B2

In Column 8, Line 19, delete "$\ddot{k}_k$" and insert -- $_k$ --, therefor.

In Column 8, Line 21, delete "ÿ$_k$" and insert -- $_k$ --, therefor.

In Column 8, Line 25, delete "$\ddot{k}_k)$" and insert -- $_k)$ --, therefor.

In Column 8, Line 27, delete "ü$_k$=" and insert -- ũ$_k$= --, therefor.

In Column 8, Line 28, delete "ü$_k$" and insert -- ũ$_k$ --, therefor.

In Column 9, Line 43, delete "$\ddot{x}(k)=0,$" and insert -- $\tilde{x}(k) = 0,$ --, therefor.

In Column 9, Line 43, delete "$\ddot{y}(k)=0$" and insert -- $(k) = 0$ --, therefor.

In Column 9, Line 63, delete "$(\ddot{y}_i(k+1)-\ddot{u}_i(k+1))+k_{i,0}(\ddot{y}_i(k)-\ddot{y}_i(k))=0,$" and insert -- $(\hat{y}_i(k+1) - \tilde{y}_i(k+1)) + k_{i,o}(\hat{y}_i(k) - \tilde{y}_i(k)) = 0$ --, therefor.

In Column 10, Line 5, delete "ÿ$_i$(k+1)=" and insert -- $_i(k+1) =$ --, therefor.

In Column 10, Line 9, delete "ÿ$_i$(k+1)=" and insert -- $_i(k+1) =$ --, therefor.

In Column 10, Line 11, delete "$\ddot{y}_{i,k+1} = E_i \ddot{u}_k + C_i F_k,$" and insert -- $\tilde{y}_{i,k+1} = E_i \tilde{u}_k + C_i F_k$ --, therefor.

In Column 10, Line 15, delete "ü(k)=" and insert -- ũ(k)= --, therefor.

In Column 10, Line 24, delete "WO" and insert -- Wf) --, therefor.

In the Claims

In Column 12, Line 39, in Claim 9, delete "(NO" and insert -- (Nf) --, therefor.